United States Patent [19]

Boatwright

[11] Patent Number: 5,246,401

[45] Date of Patent: Sep. 21, 1993

[54] FLEXIBLE SLED AND SLIDE CONSTRUCTION

[76] Inventor: Albert Boatwright, Rte. 7, Box 64M, Andrea Ave., Arcadia, Fla. 33821

[21] Appl. No.: 844,312

[22] Filed: Mar. 2, 1992

[51] Int. Cl.$^5$ .............................................. E04C 3/30
[52] U.S. Cl. ................................... 472/116; 472/90; 280/18; 280/19; 280/20; 280/21.1
[58] Field of Search ........................... 472/90, 116; 280/18-21

[56] References Cited

U.S. PATENT DOCUMENTS

| | | | |
|---|---|---|---|
| 3,140,878 | 7/1964 | Davis | 280/18 |
| 3,625,533 | 12/1971 | Boe | 280/18 |
| 3,715,120 | 2/1973 | Peltola . | |
| 4,173,351 | 11/1979 | Hetland | 280/18 X |
| 4,199,142 | 4/1980 | Reick . | |
| 4,451,032 | 5/1984 | van Olst | 472/90 |
| 4,813,663 | 3/1989 | Rice . | |
| 4,850,913 | 7/1989 | Szabad, Jr. | 280/18 X |
| 4,887,811 | 12/1989 | Tresh . | |

*Primary Examiner*—Carl D. Friedman
*Assistant Examiner*—Beth A. Aubrey
*Attorney, Agent, or Firm*—Henderson & Sturm

[57] ABSTRACT

A flexible sled and slide construction (10) wherein both the sled unit (12) and the slide unit (11) are fabricated from hinged cardboard panels (30) and (20) which are provided with hard wax coatings (31) and (21) to allow the bottom (38) of the sled unit (12) to slide easily over the top (24) of the slide unit (20).

5 Claims, 1 Drawing Sheet

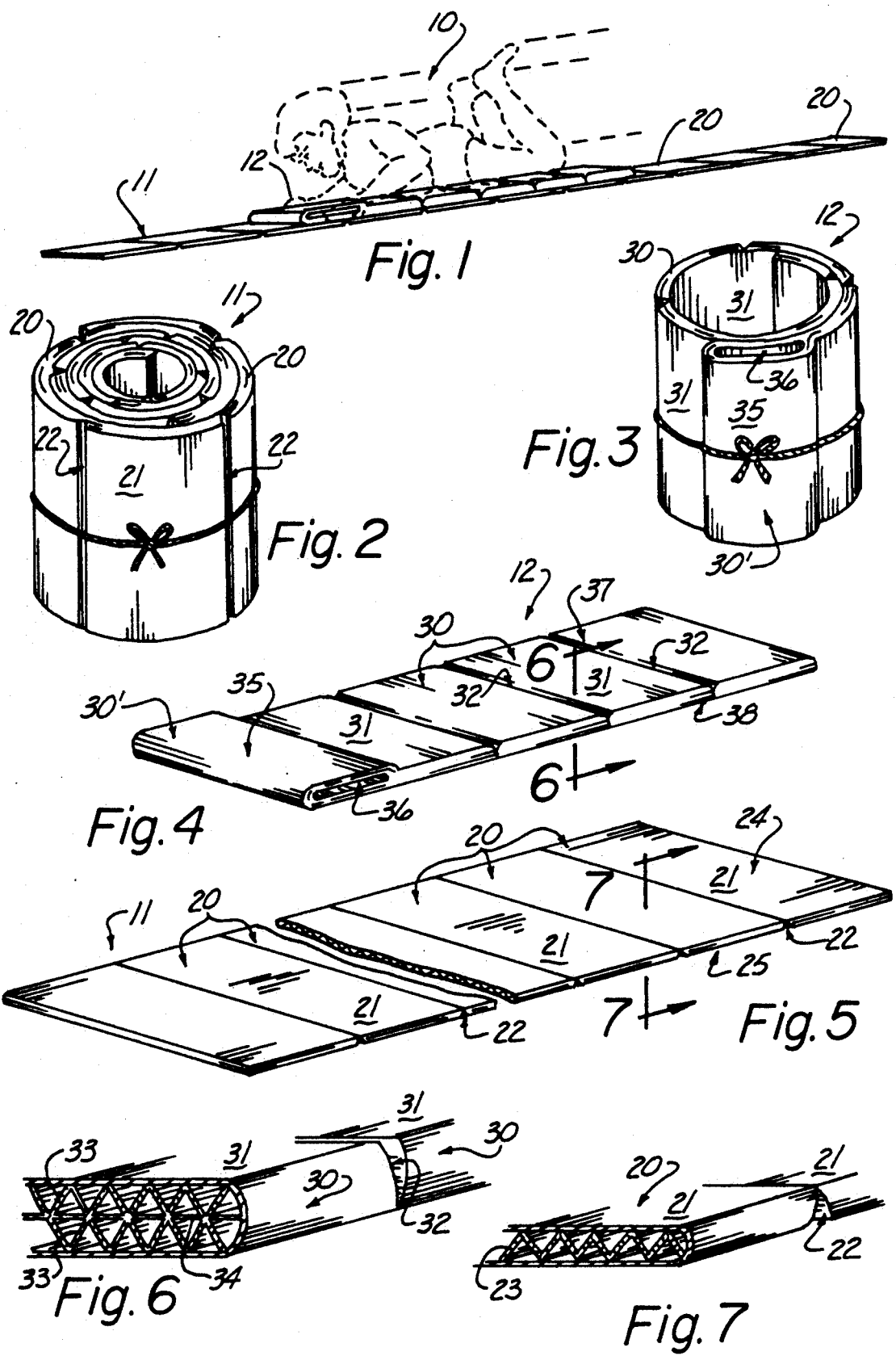

FLEXIBLE SLED AND SLIDE CONSTRUCTION

TECHNICAL FIELD

The present invention relates to the field of children's slides in general, and in particular to a combined sled and slide construction using flexible jointed components for both the sled and the slide.

BACKGROUND ART

This invention was the subject matter of Document Disclosure Program Registration No. 290,190 which was filed in the United States Patent and Trademark Office on Aug. 30, 1991.

As can be seen by reference to the following U.S. Pat. Nos. 4,887,811; 4,199,142; 4,813,663; and 3,715,120; the prior art is replete with myriad and diverse children's slide constructions.

While all of the aforementioned prior art constructions are more than adequate for the basic purpose and function for which they have been specifically designed, these patented arrangements have been uniformly deficient with regard to the provision of a sled that can be employed in combination with the slide; wherein, both the sled and the slide are provided with cushioning means to minimize any adverse impacts being imparted to the children using the slide.

Since the primary objective of any slide construction is to provide speed on a downward incline the potential for injury always poses a constant danger to the users of the slide.

As a consequence of the foregoing situation, there has existed a longstanding need particularly among existed parents of young children for a slide construction which will dramatically reduce the possibility of potential injury to their children while still providing the thrills of a rapid descent down an incline; and, the provision of such a construction is a stated objective of the present invention.

DISCLOSURE OF THE INVENTION

Briefly stated, the flexible sled and slide construction that forms the basis of the present invention comprises a sled and a slide which are both constructed of hinged panels each of which contains a distinct type of cushioning means which cooperate with one another to provide a safe and secure ride for the users of the combined device.

In addition the hinged and segmented nature of both components allows them to be rolled and/or folded up into compact bundles both for storage and for transportation to and from a place of use.

As will be explained in greater detail further on in the specification, the flexible, hinged, and cushioned nature of the components allows the slide to conform to the contour of the slope on which it is deployed, while the sled will conform in a cushioned manner to the overlying contour of the slide, to virtually eliminate any possibility of injury to a child riding on the sled.

In addition, this construction is far superior to the water slide constructions; in as much as no water is required which would create mud puddles and otherwise destroy the area immediately surrounding this new type of sled and slide construction.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of both of the components of this invention in use;

FIG. 2 is a perspective view of the slide component in its stored disposition;

FIG. 3 is a perspective view of the sled component in its stored disposition;

FIG. 4 is a perspective view of the sled construction deployed mode;

FIG. 5 is a perspective view of the slide construction in its deployed mode;

FIG. 6 is a cross-sectional view taken through line 6—6 of FIG. 4; and,

FIG. 7 is a cross-sectional view taken through line 7—7 of FIG. 5.

BEST MODE FOR CARRYING OUT THE INVENTION

As can be seen by reference to the drawings, and in particular to FIG. 1, the flexible sled and slide construction that forms the basis of the present invention is designated generally by the reference numeral (10). The construction (10) comprises in general two main structural components having the same basic construction incorporated into both a slide unit (11) and a sled unit (12). These units will now be described in seriatim fashion.

As can best be seen by reference to FIGS. 2, 5 and 7, the slide unit (11) comprises a plurality of single thickness corrugated cardboard panels (20) provided with a hard wax coating (21) and hingedly connected to one another as at (22) to provide an elongated generally rectangular slide surface.

As can also be seen particularly by reference to FIG. 7 the interior of each of the single thickness cardboard panels (20) is provided with generally triangular sawtooth corrugations (23) which provide rigidity to each of the single thickness panels (20). In addition it should further be noted that the hinged connections (22) between the adjacent panels (20) may be formed by crimping, or the like; such that in its operative mode of disposition depicted in FIG. 5, the top (24) of the slide unit (11) has a generally smooth, slick surface, while the bottom (25) of the slide unit (11) has widely spaced recesses formed by the hinged connections (22).

Turning now to FIGS. 3, 4, and 6 it can be seen that the construction of the sled unit (12) differs in only minor respects from the construction of the slide unit (11). In essence the sled unit (12) comprises a plurality of double thickness cardboard panels (30) provided with a hard wax coating (31) and hingedly connected to one another as at (32) to provide a generally rectangular sled unit (12) whose length is but a small fraction of the length of the elongated slide unit (11).

As can also be seen particularly by reference to FIG. 6, the interior of each of the double thickness cardboard panels (30) is further provided with two generally triangular sawtooth corrugations (33) separated from one another by an intermediate somewhat flexible divider (34); wherein, the divider (34) and double thickness of the panels (30) provide a cushioning feature for the sled unit (12) to absorb the impact which occurs when a child flops the sled unit (12) onto the slide unit (11).

In addition to the differences in thicknesses between the sled unit (12) and the slide unit (11) the sled unit (11)

is further provided with an elongated front panel (30') having an enlarged leading portion (35) provided with hand receiving slots (36) which permit the steering control of the sled unit (12).

Turning now to FIGS. 4 and 5, it can be seen that while the top (37) of the sled unit (12) is provided with a plurality of widely spaced recesses (32) at the location of the crimped hinges (32), the bottom (38) of the sled unit (12) has a generally smooth surface configuration; wherein, the hard wax coatings (31) and (21) on the sled (12) and slide (11) units respectively, provide a very slippery interface between the two main structural components which allows the sled unit (12) to smoothly traverse the slide unit (11) without the need for a film of water to reduce the frictional contact between the main components.

In addition as can best be seen by reference to FIGS. 2 and 3, the hinged panel construction of the sled (12) and slide (11) units, allows these components to be rolled up into very compact bundles for storage and transportation purposes.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. The combination of a sled construction and a slide construction wherein the combination comprises a sled unit fabricated from a first plurality of panels hingedly connected to one another and further provided with a hard wax coating at least on their bottom surfaces; and, a slide unit fabricated from a second plurality of panels hingedly connected to one another and further provided with a hard wax coating at least on the top surfaces wherein, the length of the sled unit is a fraction of the length of the slide unit; and, wherein the hard wax coating on the bottom surfaces of the first plurality of panels of the sled unit and the hard wax coating on the top surfaces of the second plurality of panels of the slide unit are slideably engageable with one another.

2. The combination as in claim 1; wherein, both the first and the second plurality of panels are fabricated from cardboard.

3. The combination as in claim 2; wherein, the cardboard contains interior corrugations.

4. The combination as in claim 3; wherein, said first plurality of panels is fabricated from single thickness corrugated cardboard; and, said second plurality of panels is fabricated from double thickness corrugated cardboard.

5. The combination as in claim 1; wherein, the sled unit has an elongated front panel provided with an enlarged leading portion; wherein, the enlarged leading portion is provided with hand grip recesses.

* * * * *